(12) United States Patent
Larsson et al.

(10) Patent No.: US 11,066,623 B2
(45) Date of Patent: Jul. 20, 2021

(54) SEPARATION OF CONTAMINANTS FROM A LIQUID MIXTURE

(71) Applicant: ALFA LAVAL CORPORATE AB, Lund (SE)

(72) Inventors: Per-Gustaf Larsson, Saltsjöbaden (SE); Ami Karlsson, Solna (SE)

(73) Assignee: ALFA LAVAL CORPORATE AB, Lund (SE)

( * ) Notice: Subject to any disclaimer, the term of this patent is extended or adjusted under 35 U.S.C. 154(b) by 0 days.

(21) Appl. No.: 16/468,222

(22) PCT Filed: Dec. 1, 2017

(86) PCT No.: PCT/EP2017/081191
§ 371 (c)(1),
(2) Date: Jun. 10, 2019

(87) PCT Pub. No.: WO2018/114289
PCT Pub. Date: Jun. 28, 2018

(65) Prior Publication Data
US 2020/0078750 A1 Mar. 12, 2020

(30) Foreign Application Priority Data
Dec. 20, 2016 (EP) .................................. 16205199

(51) Int. Cl.
*C10M 175/00* (2006.01)
*B01D 21/01* (2006.01)
(Continued)

(52) U.S. Cl.
CPC ... *C10M 175/0058* (2013.01); *B01D 17/0217* (2013.01); *B01D 21/01* (2013.01);
(Continued)

(58) Field of Classification Search
None
See application file for complete search history.

(56) References Cited

U.S. PATENT DOCUMENTS 5,423,979 A 6/1995 Allen
6,254,269 B1 7/2001 Ernstson et al.
(Continued)

FOREIGN PATENT DOCUMENTS

CH 228939 A 9/1943
DE 26 20 634 A1 11/1977
(Continued)

OTHER PUBLICATIONS

Machine translation CH228939. Published Sep. 30, 1943. (Year: 1943).*
(Continued)

*Primary Examiner* — Philip Y Louie
*Assistant Examiner* — Alyssa L Cepluch
(74) *Attorney, Agent, or Firm* — Birch, Stewart, Kolasch & Birch, LLP

(57) ABSTRACT

The present invention provides method for separating contaminants from a liquid mixture comprising the steps of a) providing a feed of said liquid mixture to be purified, b) adding a separation aid to the liquid mixture to be purified, wherein said separation aid is capable of binding said contaminants and c) supplying a flow of compressed air into said feed after step b) has been performed to provide a feed comprising air. The method further comprises steps d) removing air from said feed comprising air to provide a deaerated feed; and e) supplying said deaerated feed to a separator, and f) separating a phase comprising contaminants and said separation aid from said liquid mixture in said separator, wherein the separation aid added in step b) is insoluble in said liquid mixture at the separation conditions (Continued)

in step f). The present invention further provides a system for separating contaminants from a liquid mixture.

8 Claims, 2 Drawing Sheets

(51) Int. Cl.
| | |
|---|---|
| B01D 21/26 | (2006.01) |
| B01F 13/02 | (2006.01) |
| B01D 17/02 | (2006.01) |
| B04B 5/12 | (2006.01) |
| B04B 11/02 | (2006.01) |
| C10G 31/10 | (2006.01) |
| C10M 175/02 | (2006.01) |
| C10N 40/08 | (2006.01) |
| C10N 40/22 | (2006.01) |
| C10N 40/24 | (2006.01) |
| C10N 40/25 | (2006.01) |

(52) U.S. Cl.
CPC ........ *B01D 21/262* (2013.01); *B01F 13/0205* (2013.01); *B04B 5/12* (2013.01); *B04B 11/02* (2013.01); *C10G 31/10* (2013.01); *C10M 175/005* (2013.01); *C10M 175/02* (2013.01); *B04B 2005/125* (2013.01); *C10G 2300/208* (2013.01); *C10G 2400/10* (2013.01); *C10M 2203/003* (2013.01); *C10N 2040/08* (2013.01); *C10N 2040/22* (2013.01); *C10N 2040/24* (2013.01); *C10N 2040/252* (2020.05)

(56) References Cited

U.S. PATENT DOCUMENTS

| | | | |
|---|---|---|---|
| 8,807,458 | B2 | 8/2014 | Al-Ansary |
| 8,915,892 | B2 | 12/2014 | Klewinghaus |
| 9,162,197 | B2 | 10/2015 | Blum |
| 2006/0217254 | A1* | 9/2006 | Wase ................... C10G 31/10 494/37 |

FOREIGN PATENT DOCUMENTS

| | | |
|---|---|---|
| FR | 760.571 A1 | 2/1934 |
| FR | 998.240 A | 1/1952 |
| GB | 18944 A | 7/1914 |
| GB | 861654 | 2/1961 |
| GB | 1 558 147 | 12/1979 |
| JP | 2000-254466 A | 9/2000 |
| WO | WO 2004/053035 A1 | 6/2004 |
| WO | WO 2008/088273 A1 | 7/2008 |
| WO | WO 2016/040915 A1 | 3/2016 |

OTHER PUBLICATIONS

International Search Report for PCT/EP2017/081191 dated Mar. 27, 2018.
Written Opinion of the International Searching Authority for PCT/EP2017/081191 dated Mar. 27, 2018.

\* cited by examiner

SEPARATION OF CONTAMINANTS FROM A LIQUID MIXTURE

FIELD OF THE INVENTION

The present invention relates to the field of centrifugal separation, and more specifically to the use of separation aids to increase the separability of particles in a liquid mixture.

BACKGROUND OF THE INVENTION

Centrifugal separators are generally used for separation of liquids and/or solids from a liquid mixture or a gas mixture. During operation, fluid mixture that is about to be separated is introduced into a rotating bowl and due to the centrifugal forces, heavy particles or denser liquid, such as water, accumulates at the periphery of the rotating bowl whereas less dense liquid accumulates closer to the central axis of rotation. This allows for collection of the separated fractions, e.g. by means of different outlets arranged at the periphery and close to the rotational axis, respectively.

Mineral oils (also half- and full-synthetic) as well as animal oils and vegetable oils, with or without additives, are used widely in industry for various purposes, such as lubrication, cooling and insulation. During such use, the oils commonly become contaminated by different kinds of particles. Depending on the composition and the particular use different methods for regeneration of contaminated oils are used. Cleaning of lubrication oils for diesel engines on board ships or in diesel power stations may involve problems since contaminant particles have a very low density, have a small particle size and are usually kept in suspension within the oil by detergent and dispersant additives present in the lubrication oil. Conventional separation and filter technologies may remove larger contaminants but the smaller particles are usually harder to remove.

Special separation aids may be added to the oils to increase the separability. The separation aid may be a liquid separation aid having a density larger than that of the oil. The separation aid is dispersed in the contaminated oil in order to attract/bind the contaminating particles and therefore make the particles more easily separable from the oil in a centrifugal separator. This is disclosed e.g. in WO 2004/053035.

However, dosing small quantities of a liquid separation aid in to a feed of oil to be separated may be difficult, since the liquid separation aid may have low solubility in the oil. It may thus be difficult to obtain a homogeneous mixture with proper drop size distribution etc. that may be separated in a centrifugal separator.

CH 228939 discloses an apparatus for treatment of oil with sulphuric acid. Compressed air is utilised for dosing the sulphuric acid into the oil. A not specifically described blender is arranged in direct fluid communication with a centrifugal separator.

FR 760571 discloses a method and an apparatus for regenerating used lubricant oil. Sulphuric acid is mixed with oil in a container utilising pressurised air before the mixture is lead to a container for heating and cooling, and thereafter is lead through a filter.

There still exists a need in the art for a method of mixing a separation aid with a liquid mixture, such as an oil.

SUMMARY OF THE INVENTION

A main object of the present invention is to provide a method for dosing and mixing small amounts of separation aid to a liquid feed to be separated, such as an oil.

A further object is to provide a method and a system that facilitates an increased separation of e.g. soot particles from lubrication oil.

As a first aspect of the invention, there is provided a method for separating contaminants from a liquid mixture comprising the steps of:

a) providing a feed of the liquid mixture, b) adding a separation aid to the liquid mixture, wherein the separation aid is capable of binding the contaminants;

c) supplying a flow of compressed air into the feed of liquid mixture after step b) has been performed, in order to provide a feed of liquid mixture comprising air;

d) removing air from the feed of liquid mixture comprising air, in order to provide a deaerated feed of liquid mixture;

e) supplying the deaerated feed of liquid mixture to a separator, and f) separating a phase comprising contaminants and the separation aid from the liquid mixture in the separator, wherein the separation aid added in step b) is insoluble in the liquid mixture at separation conditions prevailing in step f).

The liquid mixture may comprise an oil. The oil may be pure mineral oils, half- or full-synthetic oils, or animal or vegetable oils with or without additives. The mineral oil may have a density of 0.85±0.90 g/cm$^3$ at 40° C. The oil may be a fuel oil for a diesel engine. The oil may thus comprise heavy fuel oil (HFO). HFO is a residue oil from distillation or from cracking in mineral oil processing.

As an example, the liquid mixture may comprise, or be, a lubrication oil. The lubrication oil may be for lubricating a motor. Such a motor lubrication oil is a composition for lubrication of various internal combustion engines, such as a diesel engine. The oil may be for lubricating moving parts but also for cleaning, cooling, inhibiting corrosion of the motor. The motor lubrication oils may be derived from petroleum-based and non-petroleum-synthesized chemical compounds.

The lubrication oil which is to be purified may thus have been used as lubricant, for example, in a diesel engine and been contaminated by solid particles dispersed in the oil.

The liquid mixture which is to be purified may for example comprise hydraulic oil, cylinder oil, cutting oil, rolling oil, hardening oil, mineral oil or any other suitable oil.

The liquid mixture which is to be purified may for example comprise other liquids than oil, such as bilge water or biodiesel.

A feed of liquid mixture is a flow of liquid mixture, i.e. a liquid mixture that undergoes transportation, such as in a piping system. Accordingly, a feed of liquid mixture is liquid mixture that is in motion, e.g. in a piping system.

The contaminants may comprise contaminant particles. The contaminant particles may comprise soot and/or metal particles. The contaminant particles may also comprise nanoparticles. Such contaminant particle may float in e.g. a lubrication oil to be separated and hence do not settle. Other contaminant particles may settle, at a low settling rate or at a higher settling rate.

The contaminant particles may also comprise catalyst fines, e.g. when the liquid mixture is a fuel oil for a diesel engine. Such catalyst fines comprise particles of silicon and aluminium compounds (e.g. microporous aluminium silicates or aluminosilicates known as zeolites). Catalyst fines are residues from the refining process of crude oil known as catalytic cracking, wherein long hydrocarbon molecules are cracked into shorter molecules.

The contaminants may comprise a phase that is to be separated from the liquid mixture. Thus, the contaminants may comprise a liquid. As a further example, the contaminants may comprise ions that are to be separated from the liquid mixture.

The separation aid added to the liquid mixture is insoluble in the liquid mixture at the process conditions during which the separation takes place in step f), i.e. at separation conditions prevailing in step f). Thus, if the liquid mixture is an oil, the separation aid may be insoluble in the oil during separation. An insoluble separation aid refers to a separation aid that is poorly or very poorly soluble in the liquid mixture. A common threshold to describe something as insoluble is less than 0.1 mL per 100 mL of solvent, i.e. 0.1 vol %. The separation aid may in itself be a liquid mixture.

Depending on the amount of contaminated particles, a larger or smaller amount of separation aid is added. The separation aid may contain substances causing flocculation of the contaminant particles, which result in heavier particles, which are prone to settling, and that thus, are more easily removable by centrifugal separation. The separation aid may also attract or bind the particles by way of chemical or surface chemical bonds.

In embodiments of the invention, the separation aid has a density larger than that of the lubrication oil.

The separation aid may comprise molecules having both a hydrophilic part and a hydrophobic part. Thus, the separation aid may comprise amphiphilic molecules. Further, the separation aid may comprise short-chain hydrocarbons, such as hydrocarbons having 5-10 carbon molecules. Further, the amphiphilic molecules may comprise 5-10 carbon molecules.

As an example, the liquid mixture to be purified may be a lubrication oil, and the added separation aid may comprise amphiphilic molecules having 5-10 carbon molecules As an example, the separation aid may comprise a polymer.

The separation aid involved in the method may comprise at least one of a liquid polymer, a water-soluble polymer, a hydrophilic polymer, a hydrophobic polymer, a lipophilic polymer, a fatty acid or combinations thereof. The polymer may further comprise a polyhydroxy-based alkoxylate with a higher density than the higher density fluid at the relevant separation conditions, such as temperature or pH.

An example of a polymer of the kind indicated above is referred to in WO2005/111181. Such a polymer may aid in separating pentane-insoluble contaminants from e.g. a lubrication oil.

For example, the polymer may be polyhydroxy alkoxylate with a density of 1.0-1.1 $g/cm^3$ at 40° C.

As an example, the liquid mixture may comprise a lubrication oil, and the separation aid may comprise a polymer as described above. The polymer may be capable of binding soot particles present in the lubrication oil.

The choice of the separation aid may further depend on the liquid mixture which is to be purified. The choice of separation aid may also be dependent on the kind of contaminants present in the liquid mixture.

The separation aid may contain additives which e.g. give an oil to be purified the desired properties for the intended application, such as a density of the oils within the interval of 0.85-1.05 $g/cm^3$ at 40° C.

The separation aid may or may not contain water or be soluble in water.

The addition of separation aid in step b) may be to the liquid mixture before it is transported to the separator, such as addition of separation aid in a tank holding the liquid mixture, or it may be during transport to the separator, i.e. added to a feed of the liquid mixture. Consequently, step b) may be performed before or after step a).

The addition of separation aid may be performed continuously or stepwise, in a controlled manner.

The flow of compressed air is supplied in step c) after separation aid has been added. The compressed air may thus be supplied to a feed of liquid mixture and separation aid. Supplying a flow of compressed air into the feed of liquid mixture provides an advantage by continuously mixing of the liquid mixture with the separation aid as the liquid mixture is fed towards the separator. Hence, a continuous mixing, and a continuous process for separating contaminants from a liquid mixture, may be achieved.

Further, deaeration of the feed comprising air in step d) may be performed continuously. As an alternative, the feed may be stopped in a tank which is deaerated before the deaerated feed is supplied to a separator in step e).

Step f) comprises the actual separation step. Thus, step f) may also comprise discharging a phase comprising contaminant particles and the separation aid from the separator and discharging a purified liquid phase, such as a purified oil phase, from the separator.

Step f) may comprise discharging a purified liquid phase, such as a purified oil phase, from the separator.

The separation conditions prevailing during step f) are such that the separation aid added in step b) is insoluble in the liquid mixture during separation. The separation conditions may include temperature and/or pH level of the liquid mixture that is to be separated.

Steps a), b) and c) may be performed continuously, i.e. the addition of separation aid and compressed air may be performed to a feed of liquid mixture that undergoes transportation, such as in a pipe. Also, steps d), e) and f) may be performed continuously.

Thus, the method of the first aspect of the invention may provide an in-line addition of separation aid, compressed air and subsequent separation of contaminants from a feed of liquid mixture, such as from a liquid mixture comprising oil.

The first aspect of the invention is based on the inventors' insight that the use of compressed air may be an efficient way to achieve a satisfactory mixing of separation aid to a liquid mixture. As mentioned above, the method provides for an in-line mixing of separation aid with the feed of liquid mixture to be separated. By changing the ratio between the feed flow and the flow of compressed air, different properties of the dosing is obtained. Also, the feed temperature may be regulated to achieve different dosing properties, such as drop size distribution.

In embodiments of the first aspect of the invention, the flow of compressed air is supplied in step c) to the feed of liquid mixture with a pressure so that the flow of air has a higher velocity than the feed of liquid mixture.

Thus, if the compressed air is forced to move faster than the feed of liquid mixture upon supply of the compressed air to the liquid mixture, the mixing of the separation aid with the liquid mixture may be enhanced. This may be performed by regulating the pressure of the compressed air, and/or the volume of compressed air that is supplied.

The flow of compressed air may also be supplied in step c) with a pressure so that the feed of liquid mixture comprising air has a turbulent flow. This may also facilitate mixing of the separation aid with the liquid mixture.

In embodiments of the first aspect of the invention, the flow of compressed air is supplied in step c) with a volume flow that is higher than the volume flow of the feed of liquid mixture.

The volume flow of the supplied air may thus be the expanded volume flow of the compressed air, at the pressure prevailing in the liquid mixture. The volume flow of the compressed air may thus be the volume of the air after supplying it to the feed of liquid mixture.

This is advantageous in that it facilitates mixing of the separation aid with the liquid mixture. The volume flow of compressed air may be more than five times higher than the volume flow of the feed of liquid mixture, such as more than 10 times higher than the volume flow of the feed of liquid mixture.

In embodiments of the first aspect of the invention, the compressed air is supplied in step c) at a position that is within the feed of liquid mixture.

The feed of liquid mixture has a cross section perpendicular to the direction in which the feed moves, and that cross section has a certain area. "Within the feed" may thus refer to a position that is within that area, i.e. not at the periphery of that area. Thus, a feed of liquid mixture in a pipe is moving in a direction along the extension of the pipe, and has a cross-section that corresponds to the cross-section of the pipe. "Within the feed" thus refers to a position that is not at an inner wall of the piping through which the feed of liquid mixture is transported, but instead is a position further towards the center of the cross-section of the piping.

In other words, "within the feed" may refer to a position that is not at the edge of the feed, and the edge of the feed may be at a position that is at the edge of a cross-section perpendicular to the direction in which the feed is transported.

If the compressed air is supplied at an edge of the feed, it may not mix enough with the feed but instead travel alongside the feed. Thus, if the compressed air in step c) is supplied at a position within the feed of liquid mixture, it forces the compressed air to travel through the feed of liquid mixture. Thereby, mixing of separation aid with the liquid mixture is facilitated.

As an example, the compressed air may be supplied in step c) at a position that is substantially in the center of the feed of liquid mixture, as seen in a cross-section perpendicular to the direction in which the feed is transported.

In embodiments of the first aspect of the invention, step c) further comprises transporting the feed of liquid mixture comprising air in substantially a vertical direction before air is removed in step d).

The substantially vertical direction may be a direction that forms an angle with the horizontal plane that is more than 45°, such as more than 70°. As an example, step c) may comprise transporting the feed of liquid mixture comprising air vertically before air is removed in step d).

Vertically thus refers to a direction that forms an angle with the horizontal plane that is substantially 90°.

If the feed comprising air is transported in the vertical direction, it forces the compressed air to travel through the liquid mixture, which thus facilitates mixing of separation aid with the liquid mixture. A vertical transportation may thus prevent the risk of the compressed air travelling above the liquid mixture as the feed of liquid mixture comprising air is transported to the separator.

As a second aspect of the invention, there is provided a system for separating contaminant particles from a liquid mixture comprising
 a piping system for transporting a feed of liquid mixture comprising contaminant particles to a separator,
 a dosing unit for dosing quantities of a separation aid to the feed being transported in the piping system,
 a unit for supplying compressed air into the feed being transported in the piping system, wherein the unit for supplying compressed air is arranged downstream of the dosing unit,
 a deaeration unit for removing air from the feed being transported in the piping system, wherein the deaeration unit is arranged downstream of the unit for supplying compressed air; and
 a separator for separating a phase comprising contaminant particles and the separation aid from the feed of liquid mixture, wherein the separator is arranged downstream of the deaeration unit.

The terms and definitions used in relation to the second aspect of the invention are as discussed in relation to the first aspect above.

"Downstream" refers to a position arranged later on in the transportation process to the separator, whereas "upstream" refers to a position arranged earlier in the transportation process to the separator.

The system of the second aspect is advantageous in that it allows for carrying out the method of the first aspect above.

The piping system may comprise conventional pipes suitable for transporting a liquid mixture to be separated, such as an oil, such as lubrication oil.

The dosing unit may comprise a pump, such as a membrane pump, and a reservoir for storing the separation aid. The pump may be configured to dose separation aid in a controlled way, such as stepwise or continuously.

The unit for supplying compressed air may be arranged to supply air at pressure so that the flow of air has a higher velocity than the liquid mixture in the feed, as discussed above. Furthermore, the unit for supplying compressed air may be arranged to supply air with a volume flow that is higher than the volume flow of the feed, as discussed in relation to the first aspect above In embodiments of the second aspect of the invention, the unit for supplying compressed air comprises at least one nozzle arranged to introduce air into the feed being transported in the piping system.

The nozzle may be of any suitable kind for introducing compressed air.

As an example, the at least one nozzle may be arranged to introduce air at a location that is within the feed being transported in the piping system.

Thus, the at least one nozzle may extend into the piping system so that the compressed air is introduced within the feed, and not next to it. As an example, a nozzle may extend into the interior of the piping system transporting the feed so that air is introduced at a position that is within the middle 80%, such as within the middle 50% of the diameter of the piping as seen in a cross-section perpendicular to the direction in which the feed is transported in the piping system.

As an example, at least one nozzle may extend into the piping system so that compressed air may be supplied substantially in the center of the feed.

The center of the feed may be within the middle 20% of the diameter of the piping as seen in a cross-section perpendicular to the direction in which the feed is transported in the piping system.

In embodiments of the second aspect of the invention, the piping system further comprises at least one piping section extending in the vertical direction between the unit for supplying compressed air and the deaeration unit.

As discussed in relation to the first aspect above, it is to be understood that the at least one piping section extending in the vertical direction does not have to be absolutely vertical, i.e. tilt at an angle of 90° compared to a horizontal piping section, in order to achieve an effect of forcing compressed air to travel through the liquid mixture. Thus, in embodiments, the piping system comprises at least one piping section between the unit for supplying compressed air and the deaeration unit that is not horizontal, but tilts as at least 45°, such as least 70°, compared to the horizontal direction.

As an example, the piping system may comprise at least one vertical piping section between the unit for supplying compressed air and the deaeration unit As discussed in relation to the first aspect above, forcing the feed comprising air through a vertical section forces the compressed air to travel through the liquid mixture, which thus facilitates mixing of separation aid with the liquid mixture. A vertical transportation may thus prevent the risk of the compressed air travelling "above" the liquid mixture within the piping system.

As an example, the at least one vertical piping section may form part of at least one U-shaped section.

A U-shaped piping section may be arranged so that at least one part extends in the vertical direction. For example, the straight parts of the U-shape may extend in the vertical direction, thereby forcing the feed to travel e.g. up and then down again.

As an example, the piping system may comprise several U-shaped piping sections in serial.

In embodiments of the second aspect of the invention, the deaeration unit comprises a tank having at least one valve for releasing air.

Thus, the deaeration unit may comprise a collecting/holding tank for separating out air that has been supplied to the liquid mixture and a valve capable of releasing air that has been collected in the tank, from the feed of liquid mixture comprising air.

The deaeration unit may further comprise an open tank to which the feed comprising air is supplied.

As an alternative, the deaeration unit may comprise at least one automatic air release valve for releasing trapped air as it collects. This allows for a continuous deaeration of the feed comprising air.

The automatic air release valve may comprise at least one floating vent.

In embodiments of the second aspect of the invention the separator is a centrifugal separator.

The centrifugal separator may be for separation of at least two components of a fluid mixture, such as a liquid mixture, which are of different densities. The centrifugal separator may comprise a stationary frame and a drive member configured to rotate a rotating part in relation to the stationary frame. The rotating part may comprise a spindle and a centrifuge rotor enclosing a separation space, the centrifuge rotor being mounted to the spindle to rotate together with the spindle around an axis (X) of rotation. The rotating part is supported by the stationary frame by at least one bearing device. The separation space may comprise a stack of separation discs arranged centrally around the axis of rotation. Such separation discs form surface enlarging inserts in the separation space. The separation discs may have the form of a truncated cone, i.e. the stack may be a stack of frustoconical separation discs. The discs may alternatively be axial discs arranged around the axis of rotation.

The centrifugal separator may be arranged for separating three-phases, i.e. two liquid phases and one sludge phase, or it may be for separating two phases, such as one single liquid phase and a sludge phase.

A centrifugal separator may thus be an efficient apparatus for separating out a phase comprising separation aid and particles from the liquid mixture.

The separator may alternatively be of a simpler design, such as comprising a settling tank in which the separation of a phase comprising contaminant particles and the separation aid from the feed of liquid mixture takes place.

DETAILED DESCRIPTION

The method and the system according to the present disclosure will be further illustrated by the following description with reference to the accompanying drawing.

Figure 1:
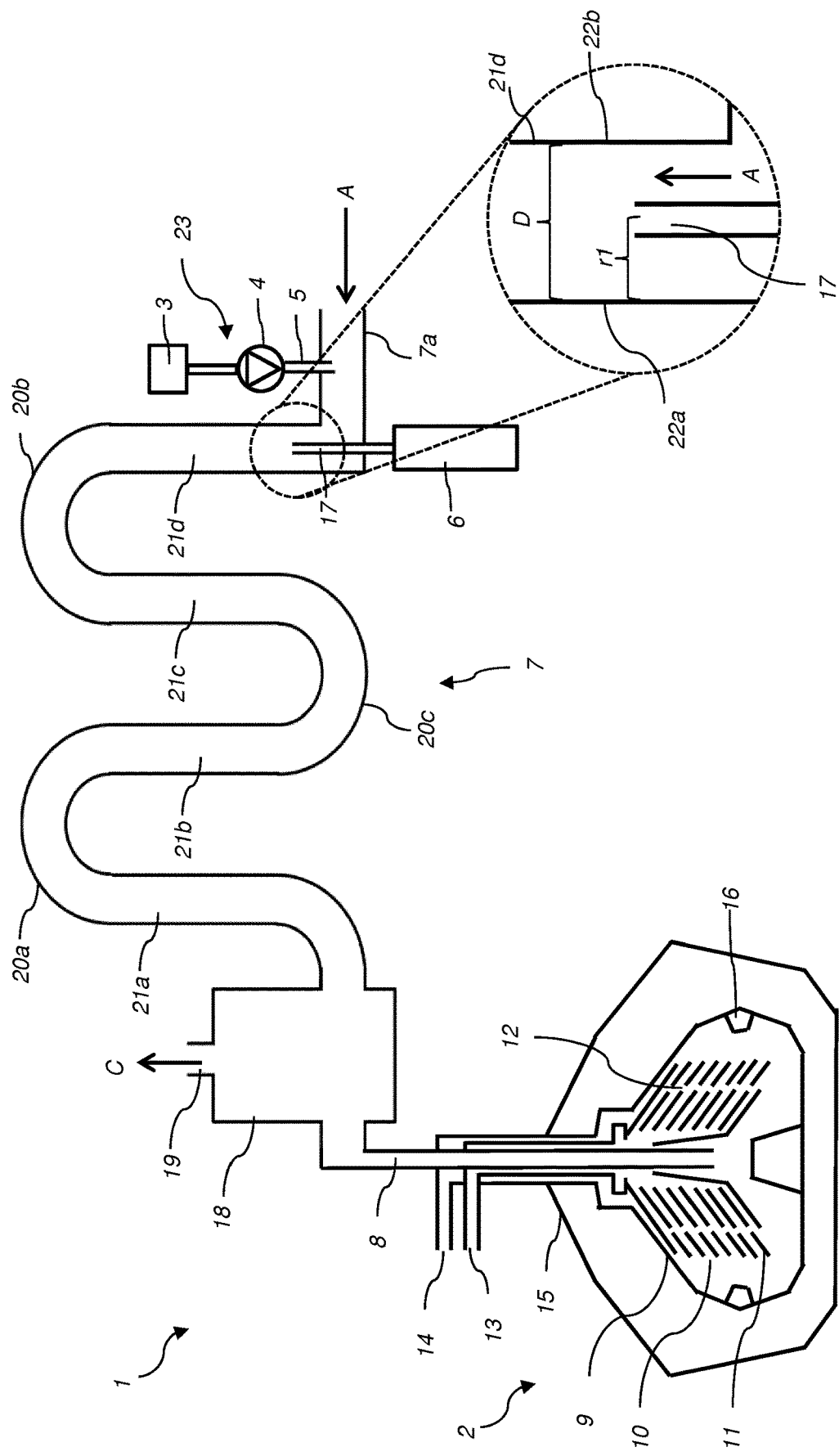
FIG. 1 shows a schematic drawing of an embodiment of a system of the present invention.

FIG. 1 shows a schematic drawing of an embodiment of a system 1 for separating contaminant particles from a liquid mixture, which in some embodiments may be marine lubrication oil contaminated with soot particles.

The system 1 comprises a centrifugal separator 2 in which the lubrication oil is cleaned. The lubrication oil to be cleaned is supplied to the centrifugal separator 2 via piping system 7, e.g. by means of a pump (not shown in FIG. 1), connected to inlet pipe 8 of the centrifugal separator 2.

A dosing unit 23 for dosing small amounts of a separation aid is arranged upstream of inlet pipe 8 for dosing small amounts of a liquid separation aid into the feed of lubrication oil that is being transported to the centrifugal separator 2. The direction of the feed is illustrated by arrow "A". The separation aid in this case comprises at least one polymer being capable of binding or agglomerating soot particles in the lubrication oil.

The separation aid is supplied to the feed from reservoir 3 by means of pump 4 stepwise via nozzle 5 that extends into the piping system 7, in this case into a horizontal pipe section 7a of piping system 7. Downstream of dosing unit 23 is a unit 6 for supplying compressed air into the feed of lubrication oil and separation aid. The unit 6 comprises a nozzle 17 extending into the piping system. As seen in the close-up view, the nozzle 17 for supplying compressed air is arranged so that the compressed air is supplied in a vertical direction in a vertical section 21d of the piping system 7. The nozzle 17 is arranged so that compressed air is supplied away from the inner edges 22a and 22b of the vertical section 21d. The nozzle in this case extends parallel with the direction of the feed A at a radial position r1 in pipe 21d that is substantially within the middle 50% of the inner diameter D of the pipe 21d, such as substantially in the middle of the pipe 21d, as seen in a cross-section perpendicular to the direction A in which the feed is transported.

The compressed air is supplied so that the volume flow of air within the feed is higher than the volume flow of the feed of liquid mixture comprising separation aid. The compressed air is further supplied with a pressure high enough to create turbulent flow of the feed of liquid mixture comprising air, thereby facilitating mixing and binding of separation aid with soot particles in the lubrication oil. Further, downstream of the unit 6 for supplying compressed air, the piping system 7 comprises three U-shaped sections 20a, 20b and 20c, which comprise vertical sections 21a, 21b, 21c and 21d. These vertical section forces the air to pass through the lubrication oil and decreases the risk of the air simply being transported vertically on top of the lubrication oil in which the separation aid has been added. Downstream of U-shaped sections 20a, 20b and 20c and vertical sections 21a, 21b, 21c and 21d, a deaeration unit 18 is arranged. This unit 18 is for removing air from the lubrication oil before the lubrication oil is to be cleaned in the centrifugal separator 2. The deaeration unit 18 is in this case a tank from which air is removed by means of valve 19 arranged at the top of the tank, as indicated by arrow "C".

The centrifugal separator 2 is arranged downstream of the deaeration unit 18 and is for purifying the lubrication oil, i.e. decreasing the amount of soot particles present in the lubrication oil.

The centrifugal separator 2 comprises a rotor 9 that forms within itself a separation chamber 10 in which centrifugal separation of the lubrication oil takes place during operation.

The separation chamber 10 is provided with a stack of frustoconical separation discs 11 in order to achieve effective separation of the fuel oil. The stack of truncated conical separation discs 11 are examples of surface-enlarging inserts. These discs 11 are fitted centrally and coaxially with the rotor and may comprise holes which form channels 12 for axial flow of liquid when the separation discs 11 are fitted in the centrifugal separator 2. As an alternative, the axial channels 12 may be in the form of cut-outs at the outer periphery of the separation discs 11. The inlet pipe 8 forms a central duct, and is thus arranged for introducing the lubrication oil for centrifugal separation in the separation chamber 10. The lubrication oil to be separated is in this embodiment supplied from the top but also separators that are fed from the bottom may be used in the system.

The rotor 9 has extending from it a liquid light phase outlet 13 for a lower density component separated from the lubrication oil, and a liquid heavy phase outlet 14 for a higher density component, or heavy phase, separated from the lubrication oil. Light phase outlet 13 could thus be for discharging a clean oil phase and heavy phase outlet 14 could be for discharging a separated aqueous phase comprising separation aid and soot particles. The outlets 13 and 14 extend through the frame 15.

The rotor 9 is further provided at its outer periphery with a set of radially sludge outlets 16 in the form of intermittently openable outlets for discharge of higher density component such as sludge or other solids in the oil. This material is thus discharged from a radially outer portion of the separation chamber 10 to the space round the rotor.

The centrifugal separator 2 is further provided with a drive motor (not shown) for rotating the rotor 9 at desired speed.

During operation of the separator in FIG. 1, the rotor 9 is caused to be rotated by the drive motor. Via the inlet pipe 8, deaerated liquid mixture, such as e.g. lubrication oil comprising soot and separation aid is brought into the separation space 10. Depending on the density differences, different phases in the lubrication oil are separated between the separation discs 11. Heavier component, such as a water phase and a sludge phase, move radially outwards between the separation discs, whereas the phase of lowest density, such as the clean oil phase, moves radially inwards between the separation discs and is forced through outlet 13 arranged at the radial innermost level in the separator. The liquid phase of higher density, e.g. a phase comprising separation aid and soot particles, is instead forced out through outlet 14 that is at a radial distance that is larger than the radial level of outlet 13. Thus, during separation, an interface between the liquid of lower density and the liquid of higher density is formed in the separation space 10. Solids, or sludge, accumulate at the periphery of the separation chamber 10 and is emptied intermittently from the separation space by the sludge outlets 16 being opened, whereupon sludge and a certain amount of fluid is discharged from the separation space by means of centrifugal force. However, the discharge of sludge may also take place continuously, in which case the sludge outlets 16 take the form of open nozzles and a certain flow of sludge and/or heavy phase is discharged continuously by means of centrifugal force.

In certain applications, the separator 1 only contains a single liquid outlet, such as only liquid outlet 13, and the sludge outlets 16. This depends on the liquid mixture, e.g. lubrication oil, that is to be processed.

Thus, the system 1 as seen in FIG. 1 is an in-line system for mixing separation aid with a liquid mixture, e.g. the lubrication oil, and thus allows for continuous addition of separation aid and subsequent continuous separation of soot particles and separation aid in the centrifugal separator.

Figure 2:
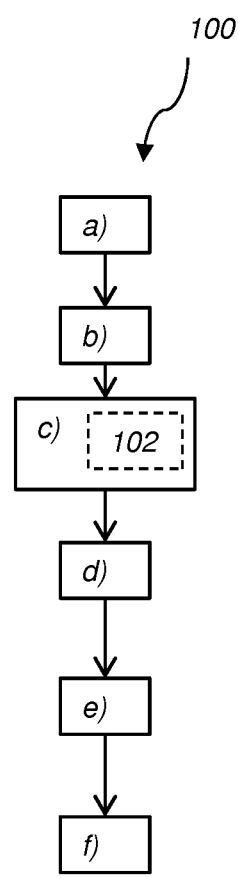
FIG. 2 shows a method of separating contaminants from a liquid mixture.

FIG. 2 illustrates embodiments of a method 100 for separating contaminants from a liquid mixture comprising the steps of:

a) providing a feed of said liquid mixture, b) adding a separation aid to the liquid mixture, wherein said separation aid is capable of binding said contaminants;

c) supplying a flow of compressed air into said feed of liquid mixture after step b) has been performed, in order to provide a feed of liquid mixture comprising air;

d) removing air from said feed of liquid mixture comprising air, in order to provide a deaerated feed of liquid mixture;

e) supplying said deaerated feed of liquid mixture to a separator, and f) separating a phase comprising contaminants and said separation aid from said liquid mixture in said separator, wherein the separation aid added in step b) is insoluble in said liquid mixture at separation conditions prevailing in step f). Aspects of the method 100 are discussed above in more detail.

According to some embodiments, the step c) may further comprise a step of transporting 102 said feed of liquid mixture comprising air in a substantially vertical direction before air is removed in step d).

The invention is not limited to the embodiment disclosed but may be varied and modified within the scope of the claims set out below. The invention is not limited to the type of separator as shown in the Figures. The term "centrifugal separator" also comprises centrifugal separators with a substantially horizontally oriented axis of rotation and separator having a single liquid outlet.

The invention claimed is:

1. A method for separating contaminants from a liquid mixture comprising the steps of:
 a) providing a feed of said liquid mixture,
 b) adding a separation aid to the liquid mixture, wherein said separation aid is capable of binding said contaminants;
 c) supplying a flow of compressed air into said feed of liquid mixture after step b) has been performed, in order to provide a feed of liquid mixture comprising air;
 d) removing air from said feed of liquid mixture comprising air, in order to provide a deaerated feed of liquid mixture;
 e) supplying said deaerated feed of liquid mixture to a centrifugal separator, and
 f) separating a phase comprising contaminants and said separation aid from said liquid mixture in said centrifugal separator, wherein the separation aid added in step b) is insoluble in said liquid mixture at separation conditions prevailing in step f).

2. The method according to claim 1, wherein said flow of compressed air is supplied in step c) to said feed of liquid mixture with a pressure so that the flow of air has a higher velocity than the feed of liquid mixture.

3. The method according to claim 1, wherein said flow of compressed air is supplied in step c) with a volume flow that is higher than a volume flow of the feed of liquid mixture.

4. The method according to claim 1, wherein the compressed air is supplied in step c) at a position that is within said feed of liquid mixture.

5. The method according to claim 1, wherein step c) further comprises a step of transporting said feed of liquid mixture comprising air in a direction that forms an angle with a horizontal plane that is between 45° and 90° before air is removed in step d).

6. The method according to claim 1, wherein said liquid mixture comprises an oil.

7. The method according to claim 1, wherein the separation aid comprises a polymer.

8. The method according to claim 6, wherein said oil is lubrication oil.

* * * * *